United States Patent [19]

Matsubara et al.

[11] Patent Number: 4,774,668
[45] Date of Patent: Sep. 27, 1988

[54] ANTI-SKID CONTROL SYSTEM FOR MOTOR VEHICLES

[75] Inventors: Yuji Matsubara, Kazo; Isao Yamaki, Iwatsuki; Hideo Akima, Yokohama; Akira Hoashi, Munakata, all of Japan

[73] Assignees: Akebono Brake Industry Co., Ltd., Tokyo; Fujitsu Limited, Kanagawa, both of Japan

[21] Appl. No.: 947,375

[22] Filed: Dec. 29, 1986

[30] Foreign Application Priority Data

Dec. 27, 1985 [JP] Japan ............................... 60-292998

[51] Int. Cl.$^4$ ............................................... B60T 8/66
[52] U.S. Cl. .............................. 364/426.02; 303/95; 303/109
[58] Field of Search ................ 364/426, 565; 180/197; 303/94–96, 102, 103, 109, 113

[56] References Cited

U.S. PATENT DOCUMENTS

| | | | |
|---|---|---|---|
| 4,395,761 | 7/1983 | Sato et al. | 364/426 |
| 4,660,896 | 4/1987 | Matsuda | 364/426 |
| 4,662,686 | 5/1987 | Matsuda | 364/426 |

Primary Examiner—Gary Chin

[57] ABSTRACT

An anti-skid control system for motor vehicles is provided wherein a computed vehicle speed is set up on the basis of respective wheel speeds of the motor vehicle; a reference speed which is lower than the computed vehicle speed by a predetermined amout and follows the computed vehicle speed with such a speed difference, is calculated on the basis of the computed vehicle speed; a high peak of the wheel speed is compared with the reference speed; when the high peak of the wheel speed is equal to or higher than the reference speed, the brake pressure is increased; and when the high peak of the wheel speed is lower than the reference speed, the brake pressure is reduced again.

2 Claims, 3 Drawing Sheets

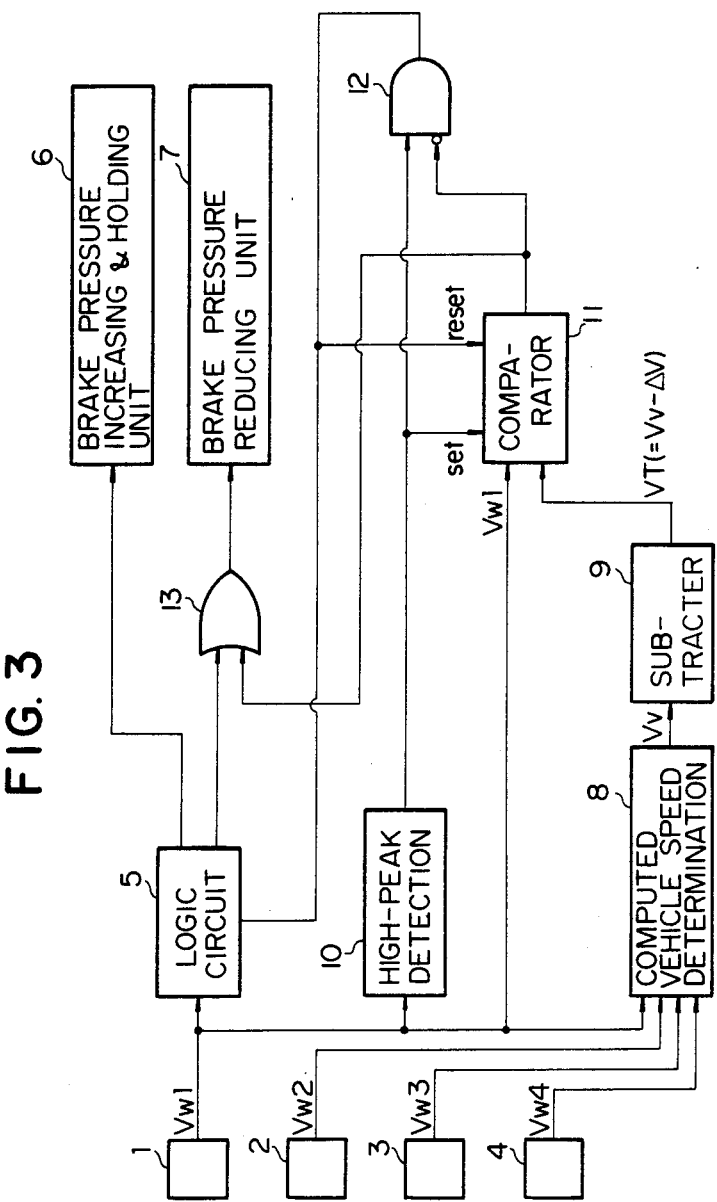

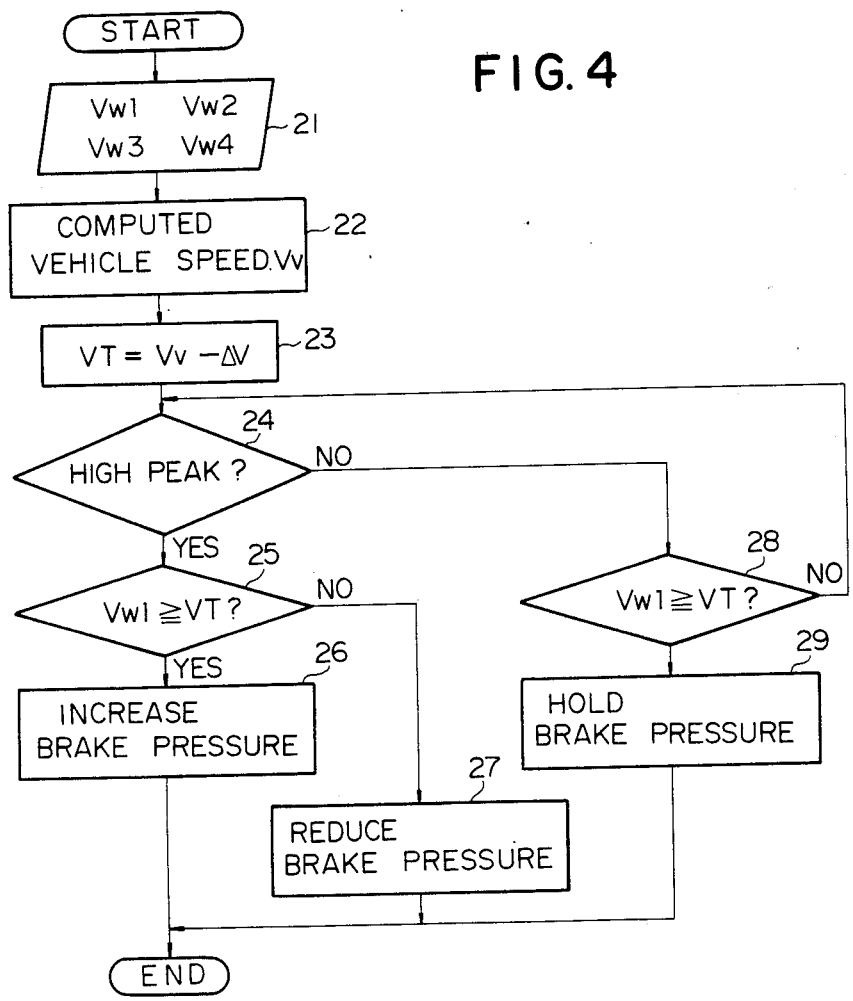

ANTI-SKID CONTROL SYSTEM FOR MOTOR VEHICLES

BACKGROUND OF THE INVENTION

1. Field of the Invention

This invention relates to a novel and improved anti-skid control system for motor vehicles, which prevents the wheels of the motor vehicle from skidding during braking operation, and more particularly it pertains to such a system designed to prevent the wheels from locking too early when the vehicle speed is low.

2. Description of the Prior Art

Generally, with an anti-skid control system for motor vehicles, braking control is effected with the aid of microcomputers such that hold valves and decay valves comprising electromagnetic valves are opened and closed on the basis of electrical signals representing wheel speed sensed by wheel speed sensors, thereby increasing, holding or reducing the brake pressure, for the purpose of securing improved steering performance and running stability of the motor vehicle, while at the same time shortening the braking distance.

FIG. 1 of the accompanying drawings illustrates manners in which wheel speed Vw and brake pressure Pw are varied in a conventional anti-skid control system. In FIG. 1, the wheel speed Vw is abruptly decelerated as a result of buildup of the brake pressure Pw; and at time t1 when the wheel speed Vw becomes equal to a reference wheel speed which is set up on the basis of the wheel speed Vw in such a manner that it follows the wheel speed Vw with a predetermined relationship therewith, the brake pressure Pw is reduced so that the wheel speed Vw is changed from deceleration to acceleration. At time t2 when there occurs a low peak of the wheel speed Vw where the latter is changed from deceleration to acceleration, the brake pressure Pw is kept constant; subsequently at time t3 when a high peak of the wheel speed Vw occurs, the brake pressure Pw is again increased. During the buildup of the brake pressure Pw which is caused at the time t3, brake pressure increasing and holding modes are repeated alternately and mincingly so that the brake pressure Pw is increased gradually; and at time t4 when the wheel speed Vw becomes equal to the aforementioned reference wheel speed like at the time t1, the brake pressure is reduced again, and similar control procedures are repeated.

With the above-described conventional anti-skid control system wherein buildup of the brake pressure Pw is started when a high peak of the wheel speed Vw occurs, however, it is likely that when the vehicle speed is low, the wheel speed Vw does not recover up to the level of the vehicle speed and rather drops further away from the level of the vehicle speed. In such a case, if the speed change gear of the motor vehicle is operated, then the deceleration of the wheel speed tends to be abruptly changed due to vibration of the speed change gear or differential gear, so that abrupt buildup control of the brake pressure Pw is produced, thus causing the wheels to be locked too early at time tn, for example, as shown in FIG. 1.

SUMMARY OF THE INVENTION

Therefore, it is an object of the present invention to provide a novel and improved anti-skid control system for motor vehicles, which is designed so that when the vehicle speed is decelerated during braking operation, the wheel speed is made to recover up to the level of the vehicle speed, thereby preventing the wheels of the motor vehicle from being locked too early.

Briefly stated, according to the present invention, a computed vehicle speed is set up on the basis of respective wheel speeds of the motor vehicle; a reference speed which is lower than the computed vehicle speed by a predetermined speed difference and parallels the computed vehicle speed with such speed difference, is calculated on the basis of the computed vehicle speed; a high peak of the wheel speed is compared with the reference speed; when the high peak of the wheel speed is equal to or higher than the reference speed, the brake pressure is increased; and when the high peak of the wheel speed is lower than the reference speed, the brake pressure is reduced again.

Other objects, features and advantages of the present invention will become apparent from the ensuing description taken in conjunction with the accompanying drawings.

BRIEF DESCRIPTION OF THE DRAWINGS

FIG. 3 is a block diagram showing a control circuit incorporated in the anti-skid control system according to the present invention.

FIG. 4 is a flow chart useful for explaining the operation of the control circuit shown in FIG. 3.

DESCRIPTION OF THE PREFERRED EMBODIMENTS

Figure 1:
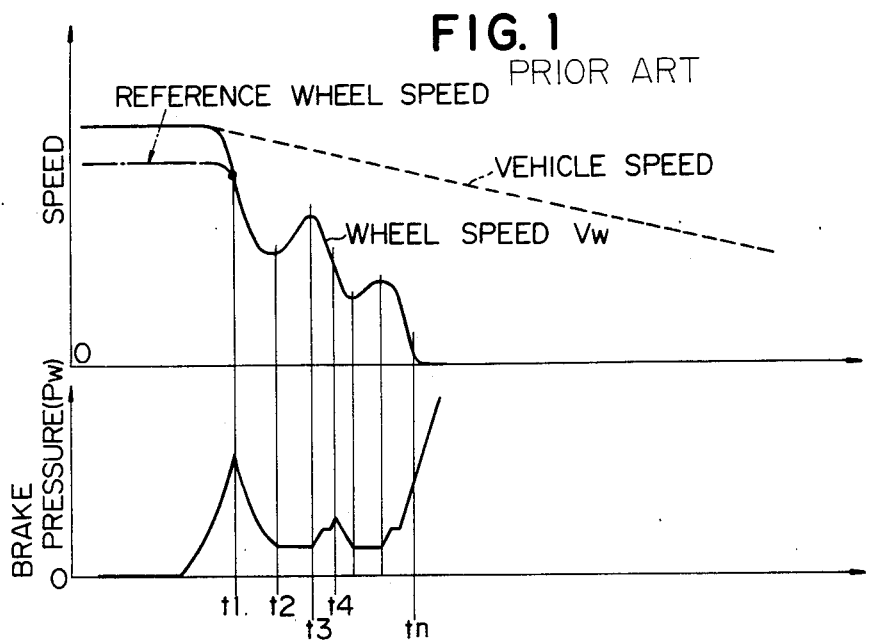
FIG. 1 is a view useful for explaining the control operation of the prior-art anti-skid control system.
Figure 2:
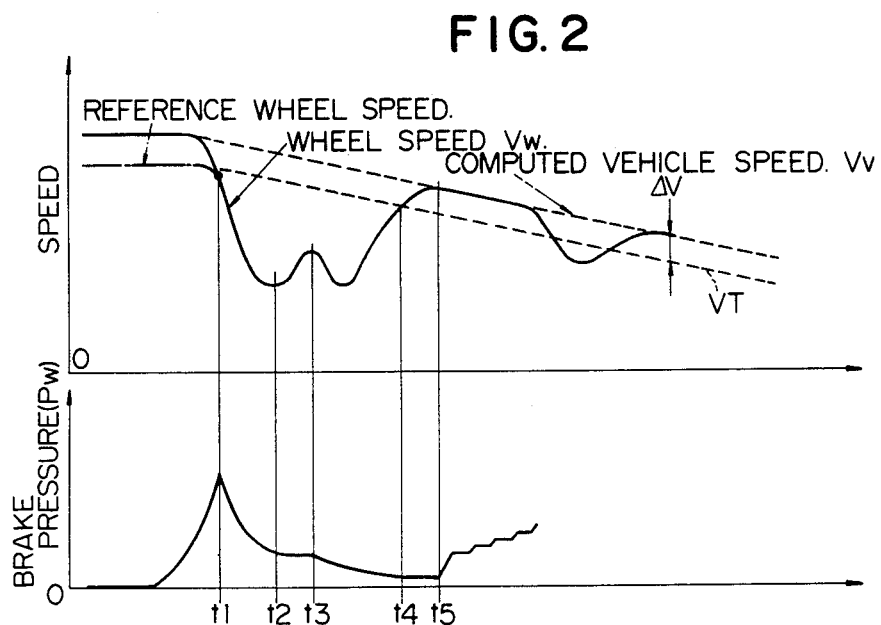
FIG. 2 is a view useful for explaining the control operation of the anti-skid control system according to an embodiment of the present invention.

FIG. 2 illustates, by way of example, the relationship between the wheel speed Vw and the brake pressure Pw which occurs in the anti-skid control system according to the present invention, wherein the highest one of the respective wheel speeds of the motor vehicle is detected; a computed vehicle speed Vv is set up on the basis of the highest wheel speed thus detected; and a reference speed Vv which is lower than the computed vehicle speed Vt by a predetermined amount $\Delta V$ and follows the computed vehicle speed Vv with such speed difference, is calculated on the basis of the computed vehicle speed. At time t1 when the wheel speed Vw is abruptly decelerated and thus becomes equal to a reference wheel speed which follows the wheel speed Vw with a predetermined relationship thereto, the brake pressure Pw is switched from buildup to reduction; as a result of this brake pressure reduction, the wheel speed Vw is changed from deceleration to acceleration; at time t2 when there occurs a low peak of the wheel speed Vw where the wheel speed Vw is changed from deceleration to acceleration, the reduction of the brake pressure Pw is stopped and the brake pressure Pw is held; and subsequently at time t3, a high peak of the wheel speed Vw is reached. Thereupon, the wheel speed Vw is compared with the reference speed VT, and since the wheel speed Vw is lower than the reference speed VT (Vw < VT) at the time t3, the high peak which occurs at the time t3 is not judged as a high peak, so that the brake pressure Pw is reduced again. As a result, the wheel speed Vw, though once decelerated, is changed from deceleration to acceleration; at time t4 when the wheel speed Vw becomes equal to the reference speed VT (Vw =VT), the brake pressure Pw is held; and at time t5 when a high peak of the wheel speed Vw is reached, buildup of the brake pressure Pw is started. In this way, after the wheel speed Vw has recovered up to the level of the computed vehicle speed Vv, the brake pressure Pw is increased; thus locking of the wheels can be avoided.

FIG. 3 is a block diagram showing a control circuit adpated to effect such anti-skid control as mentioned above in connection with FIG. 2. In FIG. 3, wheel speeds Vw1 to Vw4 are detected by wheel speed sensors 1 to 4 respectively, and the wheel speed Vw of the wheel which is now being controlled is inputted to a logic circuit 5 which is arranged to control a brake pressure increasing and holding unit 6 and a brake pressure reducing unit 7 so that the brake pressure Pw is increased, held and reduced in predetermined combinations and in succession.

The wheel speeds Vw1, Vw2, Vw3, and Vw4 are inputted to a computed vehicle speed determining circuit 8 in which a computed vehicle speed Vv is set up on the basis of these wheel speeds by detecting the highest one of the wheel speeds Vw1 to Vw4 and limiting variations in the highest wheel speed to be in the range from $-1G$ to $+1G$. The computed vehicle speed Vv is inputted to a subtracter circuit 9 in which reference speed VT is set up by subtracting a predetermined amount $\Delta V$, say 5km/h from the computed vehicle speed. The wheel speed Vw1 to be controlled is also inputted to a high-peak detecting circuit 10 and a comparator circuit 11; and in the comparator circuit 11, the wheel speed Vw1 is compared with the reference speed VT. The comparator circuit 11 is arranged to be set by the output of the high-peak detecting circuit 10 and provide an output only when the wheel speed Vw is lower than the reference speed VT (Vw<Vt). The output of the comparator circuit 11, along with the outptut of the high-peak detecting circuit 10, is passed to an AND gate 12 which is so designed that it provides no output when output is derived from the comparator circuit 11, i.e., when the wheel speed Vw1 is lower than the reference speed VT (Vw1<VT) even if output is derived from the high-peak detecting circuit 10. If output is derived from the comparator circuit 11 when the wheel speed Vw1 is at a high-peak point and lower than the reference speed VT (Vw1<VT) (at the time t3 in FIG. 2), then the output of the comparator circuit 11 is provided to the brake pressure reducing unit 7 through an OR gate 13 so that the brake pressure Pw is reduced. Output indicating that a true high peak of the wheel speed Vw 1 is reached, is provided by the AND gate circuit 12 only when the high peak of the wheel speed Vw1 is detected by the high-peak detecting circuit 10 and the wheel speed Vw1 is equal to or higher than the reference speed VT (Vw1≧VT) so that the output of the comparator circuit 11 is interrupted (at time t5 in FIG. 2); and on the basis of this output of the AND gate circuit 12, the logic circuit 5 renders the brake pressure increasing and holding unit 6 operative so that buildup of the brake pressure Pw is started. In this way, the brake pressure Pw and wheel speed Vw1 are controlled as described above in connection with FIG. 2.

With the control circuit of FIG. 3, the above-mentioned control of the brake pressure Pw is performed in accordance with the flow chart shown in FIG. 4.

First, at step 21, the respective wheel speeds Vw1 to Vw4 are read in; subsequently at step 22, the computed vehicle speed Vv is set up; at step 23, the reference speed VT is determined by subtracting a predetermined value $\Delta V$ from the computed vehicle speed Vv; and at step 24, judgment is made as to whether a high peak of the wheel speed Vw1 is reached. If the result of the judgment at the step 24 is "YES", then the step advances to step 25 where the wheel speed Vw1 is compared with the reference speed VT; if the wheel speed Vw is equal to or higher than the reference speed VT, then at step 26, the brake pressure Pw is increased (at the time t5 in FIG. 2); and if the wheel speed Vw1 is lower than the reference speed VT, the step advances to step 27 where the brake pressure Pw is reduced (at the time t3 in FIG. 2). If the result of the judgment at the step 24 is "NO", the step advances to step 28 where judgment is made as to whether the wheel speed Vw1, during acceleration, has reached the level of the reference speed VT; if the result of the judgment at the step 28 is "YES", then the brake pressure Pw is held (at the time 4 in FIG. 2); and if the result of the judgment at the step 28 is "NO", then the process is returned to the step 24. The above control flow may be repeated periodically.

As will be appreciated from the foregoing discussion, according to the present invention, the reference speed VT which is lower than the computed vehicle speed Vv by $\Delta V$ is set up; if the wheelspeed Vw does not reach the level of the reference Vt, then the brake pressure Pw is reduced, instead of being increased, even when a high peak of the wheel speed Vw is detected; and a high peak of the wheel speed Vw is judged as a true high peak only when the wheel speed Vw exceeds the level of the reference speed VT and the high peak of the wheel speed Vw is detected, whereby early-locking of the wheel which would otherwise be caused when the vehicle speed is low, can be avoided.

While the present invention has been illustrated and described with respect to specific embodiments thereof, it is to be understood that the present invention is by no means limited thereto but encompasses all changes and modifications which will become possible within the scope of the appended claims.

I claim:

1. An anti-skid control system for a motor vehicle, comprising:

first means for providing a computed vehicle speed on the basis of a plurality of electrical signals representing respective actual wheel speeds of wheels of the motor vehicle during braking;

second means operatively connected to said first means, for providing a reference speed which is at all times lower than said computed vehicle speed by a predetermined constant amount;

third means for detecting a high peak of one of the actual wheel speeds during braking;

fourth means operatively connected to said second and third means, for comparing said high peak of one of the actual wheel speeds with said reference speed; and fifth means operatively connected to said fourth means, for increasing brake pressure when said high peak of one of the wheel speeds at least equals said reference speed, and for reducing said brake pressure when said high peak of the wheel speed is lower than said reference speed.

2. The system according to claim 1, wherein said reference speed is lower than said computed vehicle speed by 5km/h.

* * * * *